(No Model.)

H. C. SPAULDING.
MOTOR VEHICLE.

No. 596,281. Patented Dec. 28, 1897.

WITNESSES:
E. B. Bolton
E. A. Scott

INVENTOR
Hollon C. Spaulding
BY
Richards Jr.
ATTORNEYS

UNITED STATES PATENT OFFICE.

HOLLON CURTIS SPAULDING, OF BOSTON, MASSACHUSETTS.

MOTOR-VEHICLE.

SPECIFICATION forming part of Letters Patent No. 596,281, dated December 28, 1897.

Application filed September 17, 1896. Serial No. 606,091. (No model.)

*To all whom it may concern:*

Be it known that I, HOLLON CURTIS SPAULDING, a citizen of the United States, residing at Boston, in the county of Suffolk and State of Massachusetts, have invented certain new and useful Improvements in Motor-Vehicles, of which the following is a specification, such as will enable those skilled in the art to which it pertains to make and use the same, reference being had to the accompanying drawings, forming part of said specification, in which similar letters of reference designate like or equivalent parts wherever found throughout both views.

This invention relates to improvements in motor-vehicle mechanism; and the object thereof is to provide means for controlling a motor-vehicle so as to obtain any speed desired between the maximum speed and the state of rest with a minimum amount of jar or vibration, and to maintain a high efficiency of the driving mechanism at all speeds, and to produce a greater torque upon the driving-wheels at a low than at a high speed, thus facilitating the mounting of grades.

As is well known in motor-vehicles as now constructed the speed of the vehicle has been obtained either by changing the speed of the driving engine or motor or by mechanical means by which the ratio of gearing between the main or power shaft and the wheel shafts or axles is varied at will. The first method usually involves a sacrifice of working efficiency, while no greater torque is produced on the wheel or axle shaft at a low than at a high speed. The second method either affords a limited range of speeds only with definite steps incapable of intermediate adjustment, or it depends upon one or more of the innumerable frictional driving devices whose efficiency is very low.

In my improvement any type of power-generator may be used in connection with my improved regulating device; but I have shown it applied to a compressed-air motor, preferably of the turbine type, which combines simplicity, compactness, and freedom from reciprocating parts which tend to cause vibration.

The invention is fully disclosed in the following specification, of which the accompanying drawings form a part, in which—

Figure 1:
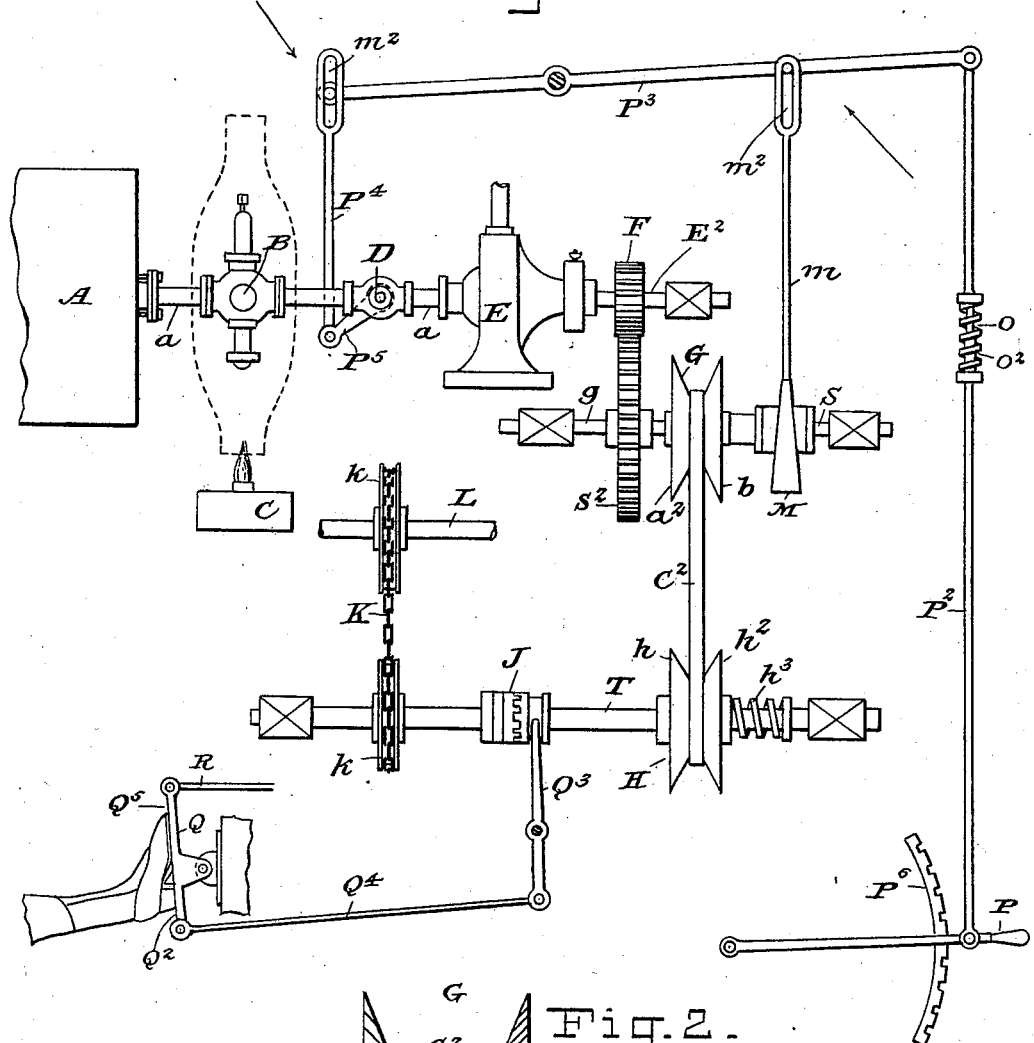
Figure 2:
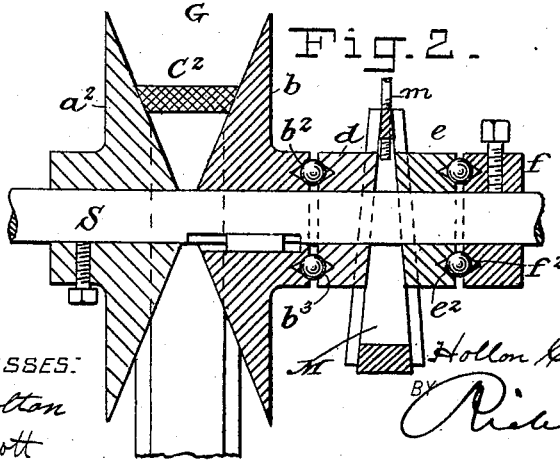

Figure 1 is a diagrammatic view of the apparatus which I employ, and Fig. 2 a sectional detail of the construction.

In the practice of my invention I provide a tank A of any suitable shape or size, and the tank A is placed in communication with an engine E, which is preferably of the turbine form, by means of a pipe $a$, in which is placed an automatic reducing-valve B, by which air is supplied to said engine at a constant pressure without regard to the pressure in the tank A. I also employ a lamp C or other convenient device for heating the valve B and adjacent parts, so as to prevent condensation and freezing, which result from the rarefaction of the air.

The pipe $a$ is provided with a throttling-valve D, which is designed to control the air-supply to the motor E, and said motor is provided with a shaft $E^2$, on which is mounted a gear-wheel F for transmitting power from the engine-shaft $E^2$ to the intermediate shaft S, which is suitably supported and which is provided with a gear-wheel $S^2$, which operates in connection with the gear-wheel F.

Mounted on the shaft S adjacent to the gear-wheel $S^2$ is a pulley G, and I also provide a shaft T, on which is mounted a corresponding pulley H, and said pulleys G and H constitute the variable-speed device by which the power is transmitted from the shaft S to the shaft T and the construction of which will be hereinafter described. The shaft T is also provided with a clutch J, by which the power is transmitted to the rear-wheel shaft or driving-axle L of the vehicle by means of a chain K and suitable sprocket-wheels $k$, and I also provide two controlling-levers P and Q, the first of which is operated by the hand and the other by the foot, and each of these levers has a double function. The foot-lever Q by pressure against the heel-plate $Q^2$ thereof throws into operative connection the clutch J, said foot-lever and said clutch being suitably connected by a lever $Q^3$, which operates said clutch and with which is connected a rod $Q^4$, which is connected with the foot-lever Q, and this operation of the clutch J completes the action of the entire driving mechanism between the engine and the wheel-shaft L, while pressure on the toe-plate $Q^5$ of the lever Q releases the clutch J and also applies the brakes by means of the rod R, connected therewith, said brakes being not shown.

It will be understood that the foot-lever Q and the hand-lever P are under control of the same person, and said hand-lever P is designed to open and shut the air-valve D, and said lever is connected with said air-valve by a rod $P^2$, which is pivotally connected with a lever $P^3$, which is connected with a crank-rod $P^4$, which is connected with the crank $P^5$, by which the valve D is operated, and when this valve is open the speed is varied by means of the gearing or pulleys G and H, the action of which will be hereinafter explained. I also provide a rack-bar $P^6$, in connection with which the lever P operates and whereby the position of said lever may be adjusted as desired, and the lever $P^3$, operated by the hand-lever P, has a telescopic section O, provided with a spiral spring $O^2$, which is adapted both for compression and tension, so as to allow the lever P to be instantly set as desired, while the mechanism G H gradually assumes its proper corresponding position, thus preventing shocks, jerks, and jars in the operation of the vehicle.

The lever $P^3$, indirectly operated by the hand-lever P, is so connected with the valve D and the mechanism including the pulleys G and H that the speed is not changed until after the valve D is wide open, nor can the valve D be shut until the pulleys G and H have been adjusted to the slowest driving speed, all of which will hereinafter appear.

In the sectional detail view represented in Fig. 2, $a^2$ and $b$ are two disks or plates which constitute the pulley G, and said disks or plates are conical on their inner surfaces, whereby a deep annular groove is formed in which is mounted a narrow thick belt $C^2$, and the disk $a^2$ is fixed or rigidly secured to the shaft S, while the disk $b$ is splined thereto, so as to have a longitudinal motion on said shaft S; but said disk $b$, together with the disk $a^2$, will always revolve or be driven by said shaft.

The hub of the disk $b$ is provided with an annular groove $b^2$, which corresponds with a similar groove $b^3$, formed in a washer $d$, in which are a number of steel balls, which constitute a ball-bearing, and a similar washer $e$ is mounted adjacent to the washer $d$ and is provided with an annular groove $e^2$, and between the washers $d$ and $e$ is placed a wedge M, which is adapted to slide back and forth on the shaft S between the washers $d$ and $e$, said wedge being provided with an oblong slot on the sides thereof or formed transversely thereof, through which the shaft S passes, and mounted on the shaft S, adjacent to the washer $e$, is a collar $f$, which is provided with an annular groove $f^2$, which corresponds with the annular groove $e^2$ in the washer $e$, and placed in said grooves are steel balls, which also constitute a ball-bearing.

The collar $f$ is secured to the shaft S, and the adjoining faces of the washers $d$ and $e$ are grooved to correspond with a feather or spline formed on the wedge M, and it is evident that as this wedge is moved forwardly or in the direction of the lever $P^3$ it must crowd the disk $b$, which constitutes a part of the pulley G, in the direction of the disk $a^2$, which also forms a part of said pulley, this operation resulting from the rotation of the shaft S, so that the belt C is gradually forced outwardly and has a larger working radius, while on the backward movement of the wedge M said working radius is lessened, as will be readily understood, the belt C approaching the shaft and consequently producing a smaller working radius, as above set out. The wedge M is connected with a lever $P^3$ by a rod $m$, and said rod and the rod $P^4$ are each provided with longitudinal slots $m^2$, by means of which connection with the lever $P^3$ is made, and by means of this construction, as hereinbefore stated, the speed is not changed until the valve D is wide open, nor can the valve D be shut until the pulleys G and H have been adjusted to the lowest driving speed.

The pulley H, which is mounted on the driving-shaft T, consists of two conical plates $h$ and $h^2$, which correspond with the disks or plates $a^2$ and $b$, which constitute the pulley G, but they are forced toward each other by a spring $h^3$, thus affording a "take up" for the slack of the belt $C^2$ when working at a short radius, as above described, and the chain K on the sprocket or gear wheels $k$, mounted on the shaft T and axle L, operates to revolve the axle L, and thus propel the vehicle.

This apparatus, as will be apparent, is well adapted to accomplish the objects of the invention as hereinbefore set out, and said apparatus is, as will be observed, comparatively simple in construction and operation. My invention, however, is not limited to the exact form, construction, and arrangement of the various parts thereof, as herein described, as it is evident that changes therein and modifications thereof and in the method of combining and arranging the various elements of the apparatus may be made without departing from the spirit of my invention or sacrificing its advantages, and I reserve the right to make all such alterations therein and modifications thereof as fairly come within the scope of the invention.

The axle L is the only part of a vehicle shown; but it will be understood that the apparatus herein described may be connected with a vehicle or the running-gear thereof in any desired manner.

Having fully described my invention, I claim as new and desire to secure by Letters Patent—

1. In combination, the variable driving-pulleys adapted to change from high to low speed, the motor-shaft in connection with one of said pulley-shafts, the motor on the motor-shaft, the supply-pipe leading to the motor, the valve and an operating means for adjusting the pulleys for the high or low speed and a connection from said means to the supply-valve, substantially as described.

2. In combination the variable driving-pulleys adapted to change from high to low speed, the motor in connection with one of said pulley-shafts, the supply-pipe leading to the motor, operating means for adjusting the pulleys from the high to the low speed, a connection between said means and the supply-valve, said operating means and connection comprising loose portions whereby the speed will not be changed until the valve is wide open and the valve cannot be closed until the pulleys have been adjusted to the lowest driving speed.

3. In combination, the shaft, the expansible pulley comprising the two sections with a groove between them, the collars $d$, $e$, the wedge operating between the collars, the collar $f$ and the ball-bearings between the collars and the pulley-section, substantially as described.

4. In combination, the expansible pulleys, with means for operating them and connections controlling said operating means including a lever and a yielding part whereby the lever may be set and the parts may assume their position gradually, substantially as described.

5. A vehicle-motor and apparatus for controlling the same, adapted to be operated by steam, compressed air, or other medium, comprising a suitable tank, a motor connected therewith by means of a pipe, a shaft connected with said motor, a regulating and a cut-off valve in the pipe which connects the motor with the tank, two other shafts suitably supported, one of which is in connection with the shaft of the motor and the other with one of the axles of the vehicle, a pulley mounted on each of said last-named shafts and composed of separate parts, one of which is laterally movable, a belt or similar device mounted on said pulleys, a clutch mounted on the shaft which is in operative connection with the axle of the vehicle, and means for operating said devices for adjusting the position of the separate parts of the pulley on the shaft which is in operative connection with the shaft of the motor, said devices being also in connection with the cut-off valve in the pipe between the tank and the motor, substantially as shown and described.

6. The combination with a vehicle of a propelling apparatus and means for controlling the same, adapted to be operated by compressed air, and comprising a suitable tank in which the operative medium is placed, a motor connected therewith by means of a pipe, a regulating and a cut-off valve placed in said pipe, a shaft connected with said motor, two other shafts suitably supported, and one of which is in connection with the shaft of the motor and the other with one of the axles of the vehicle, a pulley mounted on each of said last-named shafts, each of which consists of two separate parts having conical inner faces, and one of said parts being laterally adjustable, means for adjusting said laterally-adjustable parts, a clutch in connection with the shaft which is in operative connection with one of the axles of the vehicle, means for operating said clutch and devices for controlling the adjustment of the movable part of the pulley on the shaft which is in operative connection with the shaft of the motor, and also for operating the cut-off valve in the pipe which connects the tank and the motor, substantially as shown and described.

In witness whereof I have hereunto set my hand in presence of two witnesses.

HOLLON CURTIS SPAULDING.

Witnesses:
   CHAS. M. BRUCE,
   E. GRACE GARNSEY.